United States Patent
Yang

(10) Patent No.: US 7,991,132 B2
(45) Date of Patent: Aug. 2, 2011

(54) BILLING METHOD AND SYSTEM, AND BILLING SERVER

(75) Inventor: Shengqiang Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 320 days.

(21) Appl. No.: 12/276,714

(22) Filed: Nov. 24, 2008

(65) Prior Publication Data

US 2009/0080627 A1     Mar. 26, 2009

Related U.S. Application Data

(63) Continuation of application No. PCT/CN2007/070706, filed on Sep. 17, 2007.

(30) Foreign Application Priority Data

Sep. 18, 2006  (CN) .......................... 2006 1 0154185

(51) Int. Cl.
    *H04M 15/00* (2006.01)
    *H04M 1/66* (2006.01)
(52) U.S. Cl. .............. 379/115.01; 379/114.01; 379/198; 455/408
(58) Field of Classification Search .................. 379/111, 379/114.01, 114.03, 124, 126, 127.01, 127.03, 379/127.06, 130, 143, 144.01, 196, 197, 379/198, 115.01; 455/405–409
See application file for complete search history.

(56) References Cited

U.S. PATENT DOCUMENTS

| 4,517,411 | A | * | 5/1985 | Casner ........................... 379/84 |
| 4,656,656 | A | * | 4/1987 | Mundy et al. ............ 379/115.01 |
| 4,935,956 | A | * | 6/1990 | Hellwarth et al. ....... 379/144.02 |
| 5,159,698 | A | * | 10/1992 | Harrington et al. ...... 379/115.01 |

(Continued)

FOREIGN PATENT DOCUMENTS

CN          1204926 A          1/1999

(Continued)

OTHER PUBLICATIONS

3rd Office Action in corresponding Chinese Application No. 200610154185.7 (Aug. 7, 2009). Written Opinion of the International Searching Authority in corresponding PCT Application No. PCT/CN2007/070706 (Dec. 27, 2007).

*Primary Examiner* — Binh K Tieu

(74) *Attorney, Agent, or Firm* — Leydig, Voit & Mayer, Ltd.

(57) ABSTRACT

This invention relates to the field of communication technology, and provides a billing method and system, and a billing server. The method includes: generating, by a PBX, billing ticket information and reporting the billing ticket information to a billing server when an incoming call from an external user to an internal user of the PBX, an outgoing call from an internal user of the PBX, or a call between internal users of the PBX occurs; receiving and storing, by the billing server, the billing ticket information reported from the PBX; initiating, by the billing server, a service connection to a billing center through the PBX, or triggering, by the billing server, a fixed wireless station to initiate a service connection to a billing center directly when the PBX system is in an idle state; and sending, by the billing server, the stored billing ticket information to the billing center after the connection is established successfully. The present invention can implement billing for internal calls within the service scope of a wireless PBX without too many modifications to the existing network equipment, and has little adverse effect on the call.

17 Claims, 3 Drawing Sheets

U.S. PATENT DOCUMENTS

| | | | |
|---|---|---|---|
| 6,240,091 B1 * | 5/2001 | Ginzboorg et al. | 370/401 |
| 6,466,660 B1 * | 10/2002 | Merriam | 379/126 |
| 6,618,355 B1 * | 9/2003 | Gulliford et al. | 370/230 |
| 2003/0068025 A1 | 4/2003 | Wengrovitz et al. | |
| 2004/0176129 A1 * | 9/2004 | Menon et al. | 455/554.1 |

FOREIGN PATENT DOCUMENTS

| | | |
|---|---|---|
| CN | 1280449 A | 1/2001 |
| CN | 1286554 A | 3/2001 |
| CN | 1437353 A | 8/2003 |
| CN | 1479493 A | 3/2004 |

* cited by examiner

BILLING METHOD AND SYSTEM, AND BILLING SERVER

CROSS-REFERENCE TO RELATED APPLICATIONS

This application is a continuation of International Patent Application No. PCT/CN2007/070706, filed Sep. 17, 2007, which claims priority to Chinese Patent Application No. 200610154185.7, filed Sep. 18, 2006, both of which are hereby incorporated by reference in their entirety.

FIELD OF THE INVENTION

The present invention relates to the field of communication technology, and in particular, to a billing method and system, and a billing server.

BACKGROUND OF THE INVENTION

A Wireless Local Loop (WLL) network utilizes wireless techniques to provide terminal services for fixed terminal devices or local mobile devices. In the case that wireless access is provided by Code Division Multiple Access (CDMA) WLL, the function of wireless local private branch exchange can be implemented by a fixed wireless station to be connected to a Private Branch eXchange (PBX), and a wireless PBX network is formed. The PBX may communicate with one or more fixed wireless stations, and for the CDMA WLL, it means that the PBX communicates with one or more fixed wireless station users. The PBX is connected via a telephone interface to the fixed wireless station directly, and the fixed wireless station accesses a Public Switched Telephone Network (PSTN) via a Base Transceiver Station (BTS) and a Radio Access Controller (RAC). In this way, a plurality of wireless links may be established between the PBX and the PSTN. By enabling a plurality of users to share one or more fixed wireless stations, such a networking approach may effectively reduce the cost and meet a demand of corporate users and users in mountain villages, islands, or fishing ports for basic telephone service. However, because the users within the service scope of the PBX may call each other without passing through the PSTN, billing for the calls between those users within the service scope of the PBX may not be carried out.

During the process of making the present invention, the inventor found that a billing system is disclosed in Chinese Patent No. 97108975.2 titled "Billing Method for Wireless Multi-User Unit," in which an additional air interface billing signaling is added between a PBX and a base station, so that the billing ticket generated by internal switching and stored in the PBX may be transmitted to the billing system at the PSTN side. In this solution, the billing information is reported by means of a private billing signaling and, therefore, software of the PBX, a fixed station, a base station system, and an exchange has to be modified appropriately, which is a quite difficult job. In addition, because the processing of a large amount of billing signaling will increase the signaling load for respective devices, the traffic is so limited that there is a possibility of signaling loss, and because an end-to-end confirmation mechanism is unavailable, it is impossible to ensure reliability.

A billing method is disclosed in Chinese Patent No. 99116281.1, titled "Method for Communication of Multi-User Fixed Wireless Terminal," in which a billing module is arranged inside the PBX, the billing module generates a billing ticket according to a call or a release, and then transmits the billing ticket to the fixed wireless station communicating with the billing module. When the fixed wireless station detects the billing ticket, it sends the billing ticket to a fixed wireless terminal communicating with a billing center, and then the billing ticket is transmitted to the billing center by the fixed wireless terminal. However, in this solution, the billing center collects the billing information from respective PBXs by connecting to a fixed wireless terminal. Therefore, an interface to the fixed wireless terminal has to be added in the billing center. However, the fixed wireless terminal communicating with the billing center may not deal with heavy billing information traffic. Furthermore, because the billing ticket is reported immediately when the call is switched on and released, more and more calls will result in busier and busier billing ticket reporting, which will degrade the system performance and reduce the air interface resources available for normal calls.

SUMMARY OF THE INVENTION

The embodiments of the present invention provide a billing method and system, and a billing server, which can solve the billing problem of calls between internal users of a wireless PBX.

In an embodiment of the present invention, a billing method is provided, which includes:

receiving, by a billing server, billing ticket information reported from a PBX;

initiating a packet data service connection to a billing center; and sending the billing ticket information to the billing center after the connection is established successfully.

Another embodiment of the present invention provides a billing system for carrying out billing for a fixed wireless station, and the billing system includes:

a billing server adapted to receive billing ticket information reported from a PBX, trigger the fixed wireless station to initiate a packet data service connection, and send the billing ticket information to a billing center, after the connection is established successfully.

Another embodiment of the present invention provides a billing server, which includes:

a receiving unit, adapted to receive billing ticket information reported from a PBX;

a storing unit, adapted to store the billing ticket information received by the receiving unit; and a sending unit, adapted to send the billing ticket information stored in the storing unit to a billing center, after a fixed wireless station has initiated a packet data service connection successfully.

In the embodiments of the present invention, a billing server is added at the PBX side. When an incoming call, an outgoing call, or an internal call within the service scope of the PBX occurs, the PBX generates billing ticket information and reports the billing ticket information to the billing server, and the billing server receives and stores the billing ticket information reported from the PBX. When the system is in an idle state, the billing server instructs the PBX to initiate a service connection to a billing center through the PBX, or the billing server triggers the fixed wireless station communicating with the billing server to initiate a service connection to the billing center directly. Therefore, the present invention can implement billing for internal calls within the service scope of a wireless PBX without too many modifications to the existing network, and because a service connection to the billing center is initiated when the PBX system is in an idle state, the service connection has little adverse effect on the call.

DETAILED DESCRIPTION OF THE EMBODIMENTS

The embodiments of the present invention will be further described as follows in detail by referring to the accompanying drawings, so that objects, technical solutions, and advantages of the embodiments of the present invention can become more apparent.

Figure 1:
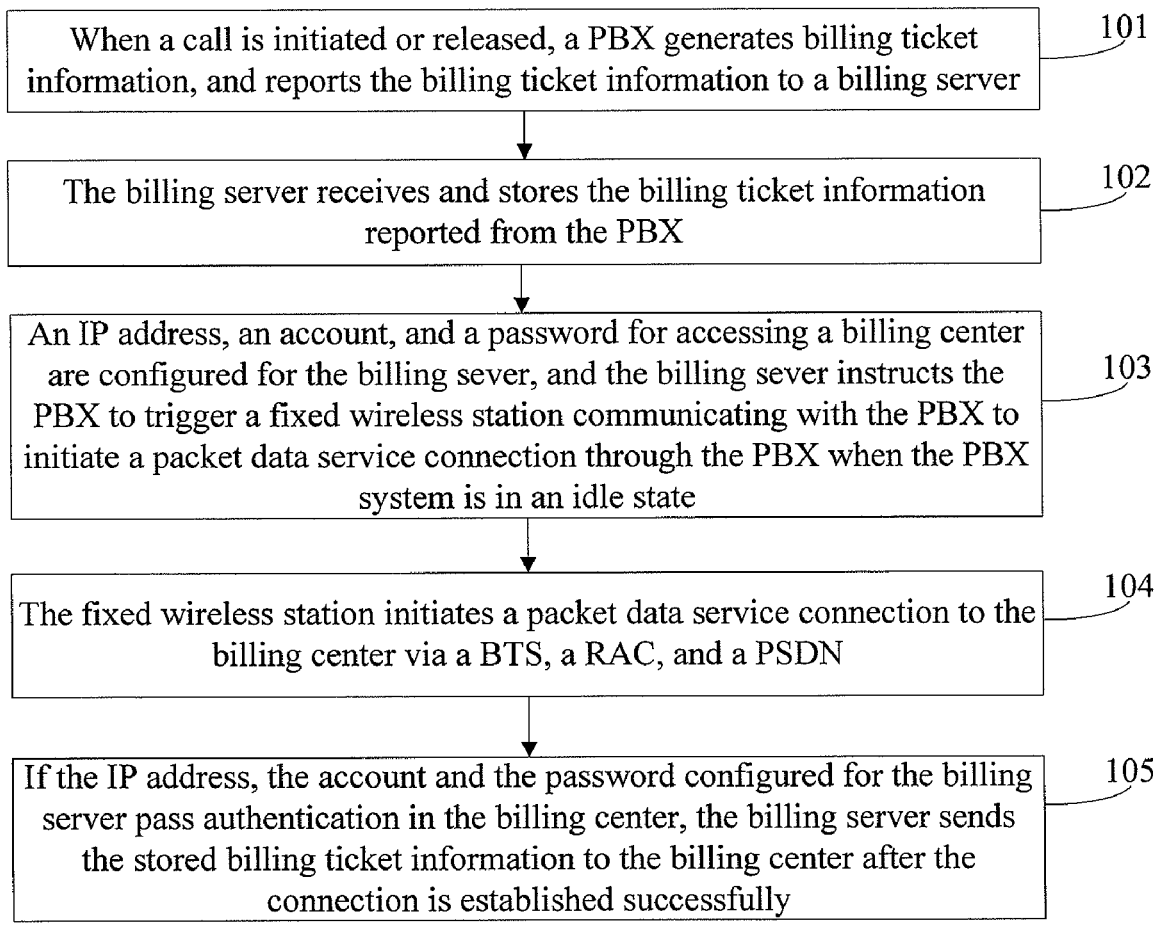
FIG. 1 is a flow chart of an embodiment of the present invention.

FIG. 1 is a flow chart of an embodiment of the present invention. The method according to the embodiment of the present invention includes:

Step 101: When a call is initiated or released, a PBX generates billing ticket information, and reports the billing ticket information to a billing server;

Step 102: The billing server receives and stores the billing ticket information reported from the PBX;

Step 103: An Internet Protocol (IP) address, an account, and a password for accessing a billing center are configured for the billing server, and the billing server instructs the PBX to trigger a fixed wireless station communicating with the PBX to initiate a packet data service connection through the PBX when the PBX system is in an idle state;

Step 104: The fixed wireless station initiates a packet data service connection to the billing center via a Base Transceiver Station (BTS), a Radio Access Controller (RAC), and a Packet Data Serving Node (PDSN);

Step 105: If the IP address, the account, and the password configured for the billing server pass authentication in the billing center, the billing server sends the stored billing ticket information to the billing center after the connection is established successfully.

The determination of the idle time of the PBX system may be configured manually, for example, the billing server may start a timing task at 2:00 a.m., and when the time of the system reaches 2:00 a.m., the timing task initiates a packet data service connection to the billing center, or may be detected and determined by the system automatically.

When the PBX system is in an idle state, the billing server handles the billing ticket information appropriately or packs the billing ticket information directly, and then sends the stored billing ticket information to the billing center.

The PBX system includes a service connection between internal users of the PBX, and further includes a service connection between an internal user of the PBX and an external user.

The packet data service connection between the PBX system and the billing center uses a fixed wireless station shared by the PBX and, therefore, it does not have to configure a fixed wireless station for the billing server separately.

The software code in the PBX is required to be modified, so as to receive billing packet data reported from the billing server and send the data.

In addition, the billing center may further initiate a packet data connection to the billing server, so as to obtain the billing ticket information from the billing server actively.

Figure 2:
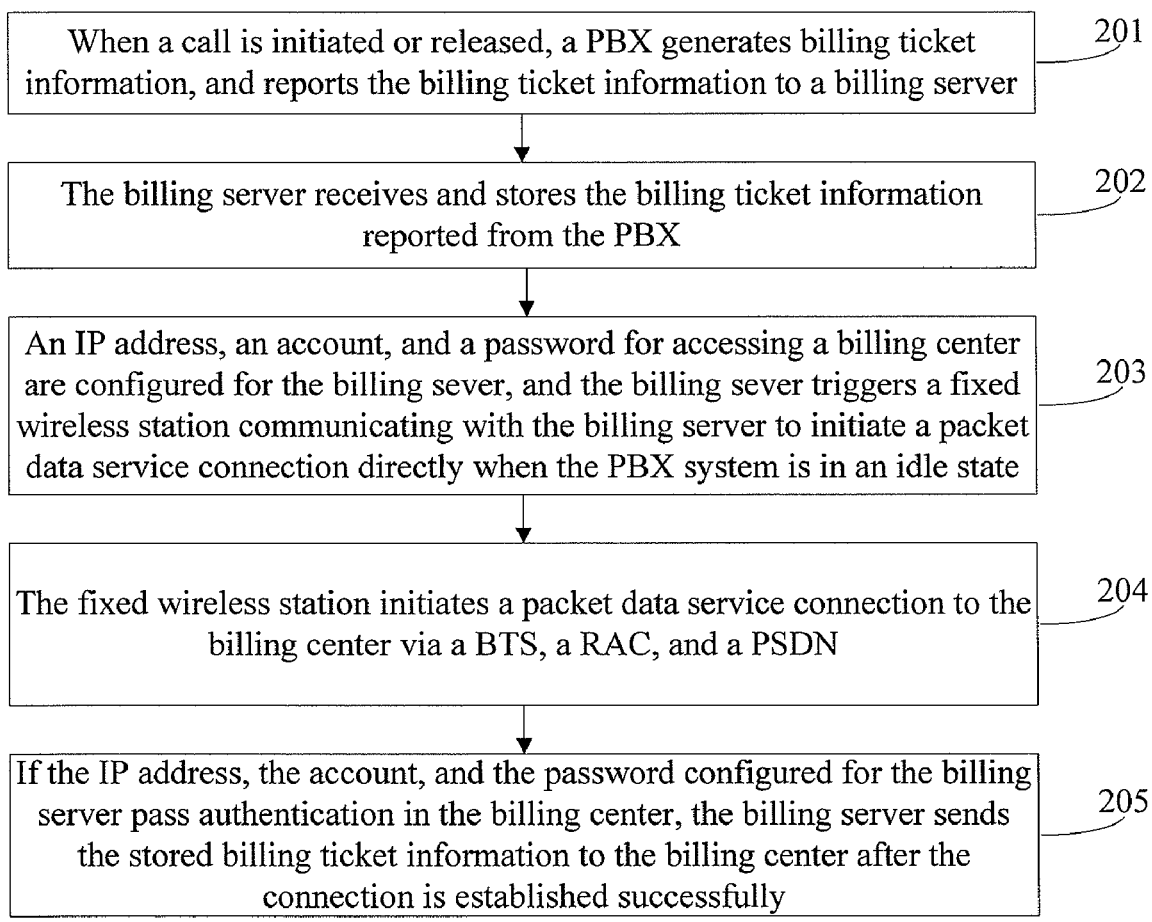
FIG. 2 is a flow chart of another embodiment of the present invention.

Referring to FIG. 2, FIG. 2 is a flow chart of another embodiment of the present invention. The method according to the embodiment of the present invention includes:

Step 201: When a call is initiated or released, a PBX generates billing ticket information, and reports the billing ticket information to a billing server;

Step 202: The billing server receives and stores the billing ticket information reported from the PBX;

Step 203: An IP address, an account, and a password for accessing a billing center are configured for the billing server, and the billing server triggers a fixed wireless station communicating with the billing server to initiate a packet data service connection directly, when the PBX system is in an idle state;

Step 204: The fixed wireless station initiates a packet data service connection to the billing center via a BTS, a RAC, and a PDSN;

Step 205: If the IP address, the account, and the password configured for the billing server pass authentication in the billing center, the billing server sends the stored billing ticket information to the billing center, after the connection is established successfully.

In above embodiments, the call initiated or released by the PBX may include an incoming call, an outgoing call, or a call between internal users of the PBX. Hereinafter, the three cases will be described in detail, respectively.

(1) An external user initiates a call to an internal user of a PBX:

(11) The external user sends call information to a PSTN;

(12) The PSTN initiates a call request to the internal user of the PBX via a RAC, a BTS, and a fixed wireless station;

(13) The PBX generates billing ticket information and reports the billing ticket information to a billing server after the call request is established successfully;

(14) The billing server receives and stores the billing ticket information reported from the PBX;

(15) An IP address, an account, and a password for accessing a billing center are configured for the billing server, and when the PBX system is in an idle state, the billing server instructs the PBX to trigger the fixed wireless station communicating with the PBX to initiate a packet data service connection through the PBX, or the billing server triggers the fixed wireless station communicating with the billing server to initiate a packet data service connection directly;

(16) The fixed wireless station initiates a packet data service connection to the billing center via the BTS, the RAC, and the PDSN; and

(17) If the IP address, the account, and the password configured for the billing server pass authentication in the billing center, the billing server sends the stored billing ticket information to the billing center after the connection is established successfully.

(2) An internal user of a PBX initiates an outgoing call to an external user:

(21) The PBX sends call request information to a fixed wireless station;

(22) The fixed wireless station initiates a call request to the external user via a BTS, a RAC, and a PSTN;

(23) The PBX generates billing ticket information and reports the billing ticket information to a billing server after the call request is established successfully;

(24) The billing server receives and stores the billing ticket information reported from the PBX;

(25) An IP address, an account, and a password for accessing a billing center are configured for the billing server, and when the PBX system is in an idle state, the billing server instructs the PBX to trigger the fixed wireless station communicating with the PBX to initiate a packet data service connection through the PBX, or the billing server triggers the fixed wireless station communicating with the billing server to initiate a packet data service connection directly;

(26) The fixed wireless station initiates a packet data service connection to the billing center via the BTS, the RAC, and the PDSN; and

(27) If the IP address, the account, and the password configured for the billing server pass authentication in the billing center, the billing server sends the stored billing ticket information to the billing center after the connection is established successfully.

The PSTN stores the billing ticket information generated by a user session, and sends the billing ticket information to the billing server communicating with the PSTN.

(3) Communication between internal users of a PBX:

(31) A call request is initiated between the internal users of the PBX;

(32) The PBX generates billing ticket information and reports the billing ticket information to a billing server after the call connection is established successfully;

(33) The billing server receives and stores the billing ticket information reported from the PBX;

(34) An IP address, an account, and a password for accessing a billing center are configured for the billing server, and when the PBX system is in an idle state, the billing server instructs the PBX to trigger a fixed wireless station communicating with the PBX to initiate a packet data service connection through the PBX, or the billing server triggers the fixed wireless station communicating with the billing server to initiate a packet data service connection directly;

(35) The fixed wireless station initiates a packet data service connection to the billing center via a BTS, a RAC, and a PDSN; and

(36) If the IP address, the account, and the password configured for the billing server pass authentication in the billing center, the billing server sends the stored billing ticket information to the billing center after the connection is established successfully.

The determination of the idle time of the PBX system may be configured manually, or may be detected and determined by the system automatically.

After the connection between the billing server and the billing center is established successfully, that is, an IP channel between the billing server and the billing center has been established, the billing server may send the stored billing ticket information to the billing center by using some matured protocols based on the Transfer Control Protocol/Internet Protocol (TCP/IP) (such as the File Transfer Protocol).

It should be understood by those ordinarily skilled in the art that all or part of steps in the method for implementing the above embodiments may be accomplished by a hardware associated with a program instruction. The program may be stored in a computer readable storage medium, and the storage medium may be a ROM/RAM, a magnetic disk, an optical disk and the like.

Figure 3:
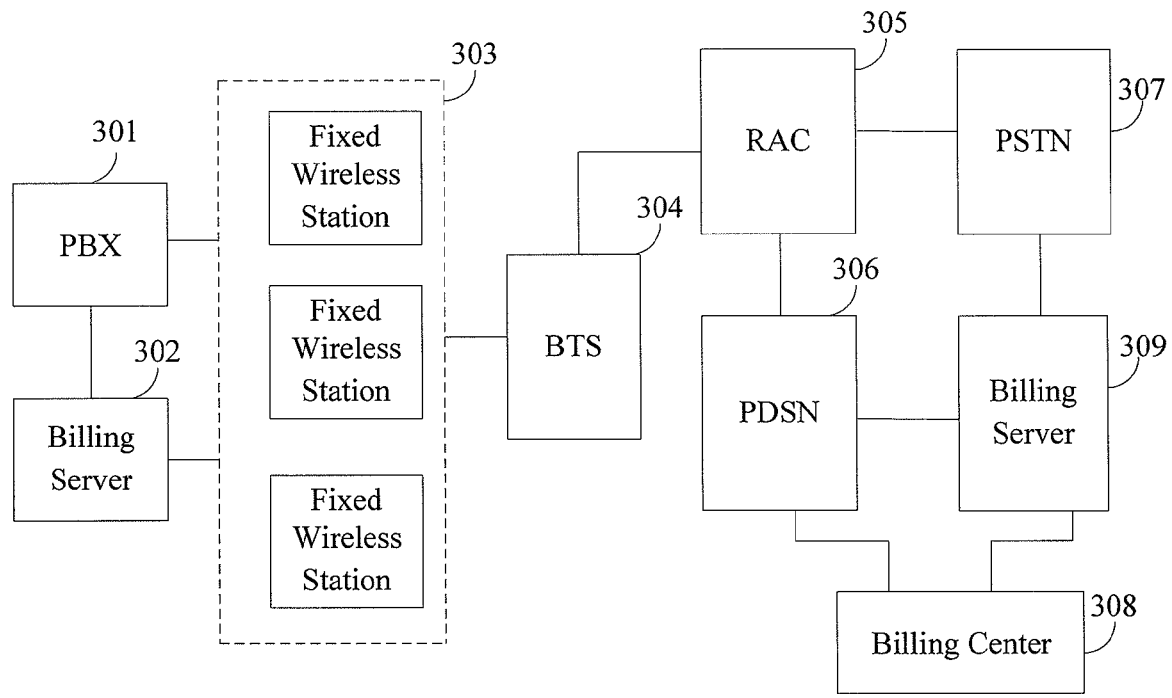
FIG. 3 is a block diagram of a system, according to an embodiment of the present invention.

Referring to FIG. 3, FIG. 3 is a block diagram of a system, according to an embodiment of the present invention. The system provided in the embodiment of the present invention is adapted to carry out billing for a fixed wireless station 303, and the system includes a PBX 301, a billing server (named "BILL") 302, and a billing center 308.

The billing server 302 is adapted to receive and store billing ticket information reported from the PBX 301. When the PBX system is in an idle state, the billing server 302 is adapted to report a trigger signal to the PBX 301, and the PBX 301 triggers the fixed wireless station 303 communicating with the PBX 301 to initiate a packet data service connection, or the billing server may trigger the fixed wireless station 303 communicating with the billing server to initiate a packet data service connection directly. The billing server sends the stored billing ticket information to the billing center 308 after the connection is established successfully.

The system may further include a BTS 304, a RAC 305, and a PDSN 306.

The BTS 304 is adapted to receive information sent from the fixed wireless station 303 and send the information to the RAC 305, or receive a signal sent from the RAC 305 and send the signal to the fixed wireless station 303;

The PDSN 306 is adapted to send a packet data sent from the RAC to the billing center 308, and send the stored billing ticket information to the billing center 308 after the connection between the billing server 302 and the billing center 308 is established successfully.

The system further includes a PSTN 307 which is adapted to send call request information from an external user to an internal user of the PBX 301 and report the billing ticket information generated for the external user to a billing server 309 at the PSTN 307 side when the external user establishes a call connection with the internal user of the PBX 301 directly, so that the billing server 309 at the PSTN 307 side may send the billing ticket information to the billing center 308 directly.

The billing server 302 in the above system is adapted to report a trigger signal to the PBX 301. When the PBX 301 triggers the fixed wireless station 303 communicating with the PBX 301 to initiate a packet data service connection, the billing server 302 uses a fixed wireless station shared with the PBX 301 to establish the packet data service connection from the billing server 302 to the billing center 308 and does not require a separate fixed wireless station 303 for the billing server 302. The billing server 302 and the PBX 301 share an equipment in the fixed wireless station 303, but the software code in the PBX 301 must be modified to implement the share of the fixed wireless station 303, and the PBX 301 receives the billing ticket information reported from the billing server 302 and sends the billing ticket information out.

The billing server 302 may further be adapted to trigger the fixed wireless station 303 communicating with the billing server 302 to initiate a packet data service connection directly, and there is no adverse effect to the PBX 301.

The fixed wireless station 303 may include a plurality of fixed wireless stations. The PBX 301 may access one or more of the fixed wireless stations, and the billing server 302 may access any one of the fixed wireless stations.

The PBX 301 and the billing server 302 may be provided in the same equipment physically. The billing server 302 may be a software module running on the PBX, and receives and stores billing ticket information generated by the PBX, and sends the billing ticket information to the billing center, when the PBX system is in an idle state. The determination of the idle time of the PBX system may be configured manually, or may be detected and determined by the system automatically. For example, the billing server is adapted to start a timing task at 2:00 a.m. and when the time of the system reaches 2:00 a.m., the timing task performs the initiation of a packet data service connection to the billing center.

If the billing server 302 is at the PBX 301 side, it may use a PC, or share an equipment with the PBX 301, and the billing server 302 provides at least one network port and communicates with the PBX 301 via the network port, and a billing software is installed in the billing server 302 for the management of receiving, storing, and sending the billing ticket information reported from the PBX 301.

Figure 4:
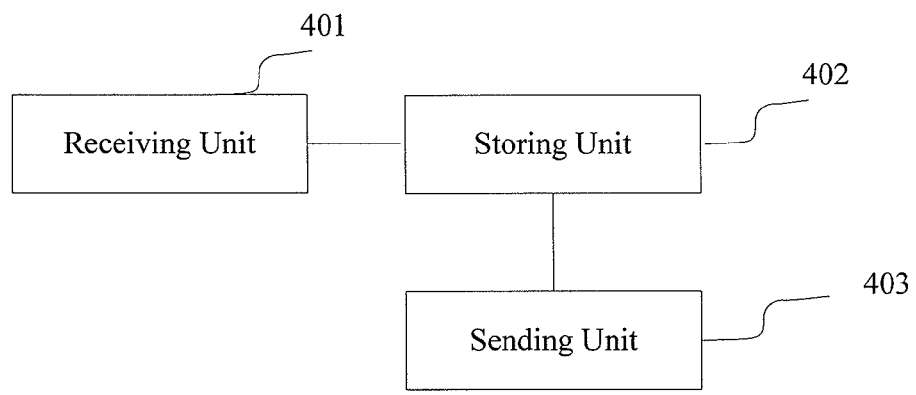
FIG. 4 is a structural schematic diagram of the billing server, according to an embodiment of the present invention.

Referring to FIG. 4, FIG. 4 is a structural schematic diagram of a billing server, according to an embodiment of the present invention. The billing server includes:

a receiving unit 401, adapted to receive billing ticket information reported from a PBX;

a storing unit 402, adapted to store the billing ticket information received by the receiving unit 401; and a sending unit 403, adapted to send the billing ticket information stored in the storage unit 402 to a billing center, after a fixed wireless station has initiated a packet data service connection successfully.

Universal Serial Bus (USB) driver software and a MODEM matching the fixed wireless station may be installed in the billing server, and the billing server may communicate with the fixed wireless station via the MODEM.

The PSTN may be replaced by a Mobile Switch Center (MSC). If the system accesses to a MSC, the corresponding RAC may be replaced by a Base Station Controller (BSC).

The present invention is not only applicable to a WLL system, but also applicable to a variety of wireless networks including mobile networks such as a Global System for Mobile Communications (GSM), Code Division Multiple Access (CDMA), Wideband Code Division Multiple Access (WCDMA), and the like.

In the embodiments of the present invention, a billing server is added at the PBX side. When an incoming call, an outgoing call, or an internal call within the service scope of the PBX occurs, the PBX generates billing ticket information and reports the billing ticket information to the billing server, and the billing server receives and stores the billing ticket information reported from the PBX. When the system is in an idle state, the billing server instructs the PBX to initiate a service connection to a billing center through the PBX, or the bill server triggers the fixed wireless station communicating with the billing server to initiate a service connection to the billing center directly. Therefore, the present invention can implement billing for internal calls within the service scope of a wireless PBX without many modifications to the existing network, and because a service connection to the billing center is initiated when the PBX system is in an idle state, the service connection has little adverse effect to the call. In addition, the service connection between the billing server and the billing center is a wireless packet data channel, which has a high transmission velocity and assures reliability.

The billing method and system provided in the present invention have been described in detail with reference to some examples illustrating the principle and the embodiments, and the embodiments are merely for help of understanding the method and the core idea of the present invention. Meanwhile, according to the conception of the invention, those ordinarily skilled in the art should recognize that various variations and modifications can be made to the embodiments and the application scope. In summary, the contents of the description should not be interpreted as limitation to the present invention.

What is claimed is:

1. A billing method, comprising:
    receiving, by a billing server, billing ticket information reported from a Private Branch eXchange, wherein the billing ticket information is generated by the Private Branch eXchange;
    triggering, by the billing server, a fixed wireless station to initiate a packet data service connection when the Private Branch eXchange is in idle state;
    initiating, by the fixed wireless station, the packet data service connection to a billing center of a wireless communication system; and
    sending, by the billing server, the billing ticket information to the billing center via the packet data service connection after the packet data service connection is established successfully.

2. The method according to claim 1, wherein the Private Branch eXchange generates the billing ticket information when a call is initiated or released.

3. The method according to claim 2, wherein when the call is initiated or released, the Private Branch eXchange generates the billing ticket information if the call is made between internal users of the Private Branch eXchange.

4. The method according to claim 2, wherein when the call is initiated or released, the Private Branch eXchange generates the billing ticket information and reports the billing ticket information to the billing server if the call is made between an internal user of the Private Branch eXchange and an external user through a Public Switched Telephone Network, and the billing ticket information generated by the call of user is reported through the Public Switched Telephone Network to the billing server.

5. The method according to claim 3, wherein when the Private Branch eXchange is in an idle state, the billing server initiates a packet data service connection to the billing center.

6. The method according to claim 4, wherein when the Private Branch eXchange is in an idle state, the billing server initiates a packet data service connection to the billing center.

7. The method according to claim 5, wherein before the billing server initiates a packet data service connection to the billing center, the method further comprises:
    configuring the billing server with an Internet Protocol address, an account, and a password for accessing the billing center.

8. The method according to claim 6, wherein before the billing server initiates a packet data service connection to the billing center, the method further comprises:
    configuring the billing server with an Internet Protocol address, an account, and a password for accessing the billing center.

9. The method according to claim 7, wherein the process that the billing server initiates a packet data service connection to the billing center comprises:
    instructing, by the billing server, the Private Branch eXchange to trigger a fixed wireless station according to the IP address, the account and the password configured for the billing server; and
    initiating, by the fixed wireless station, a packet data service connection to the billing center through a Base Transceiver Station, a Radio Access Controller and a Packet Data Serving Node.

10. The method according to claim 8, wherein the process that the billing server initiates a packet data service connection to the billing center comprises:
    instructing, by the billing server, the Private Branch eXchange to trigger a fixed wireless station according to the IP address, the account and the password configured for the billing server; and
    initiating, by the fixed wireless station, a packet data service connection to the billing center through a Base Transceiver Station, a Radio Access Controller and a Packet Data Serving Node.

11. The method according to claim 7, wherein the process that the billing server initiates a packet data service connection to the billing center comprises:
   triggering, by the billing server directly, a fixed wireless station according to the IP address, the account and the password configured for the billing server; and
   initiating, by the fixed wireless station, a packet data service connection to the billing center through a Base Transceiver Station, a Radio Access Controller, and a Packet Data Serving Node.

12. The method according to claim 8, wherein the process that the billing server initiates a packet data service connection to the billing center comprises:
   triggering, by the billing server directly, a fixed wireless station according to the IP address, the account and the password configured for the billing server; and
   initiating, by the fixed wireless station, a packet data service connection to the billing center through a Base Transceiver Station, a Radio Access Controller, and a Packet Data Serving Node.

13. A billing system for carrying out billing for a fixed wireless station, comprising a billing server and a fixed wireless station, wherein:
   the billing server is adapted to receive billing ticket information reported from a Private Branch eXchange, trigger the fixed wireless station to initiate a packet data service connection when the Private Branch eXchange is in idle state;
   the fixed wireless station is adapted to initiate the packet data service connection to a billing center of a wireless communication system;
   the billing server is further adapted to send the billing ticket information to a the billing center via the packet data service connection after the packet data service connection is established successfully.

14. The system according to claim 13, wherein the billing server is adapted to instruct the Private Branch eXchange to trigger the fixed wireless station to initiate a packet data service connection.

15. The system according to claim 13, wherein the billing server is adapted to directly trigger the fixed wireless station to initiate a packet data service connection.

16. The system according to claim 13, further comprising:
   a Base Transceiver Station adapted to receive information sent from the fixed wireless station and send the information to a Radio Access Controller, or receive information sent from the Radio Access Controller and send the information to the fixed wireless station;
   the Radio Access Controller adapted to receive the information sent from the Base Transceiver Station and send information to the Base Transceiver Station; and
   a Packet Data Serving Node adapted to send a packet data sent from the Radio Access Controller to the billing center, or send a packet data sent from the billing center to the Radio Access Controller, wherein the billing server sends the billing ticket information to the billing center after the connection between the billing server and the billing center is established successfully.

17. A billing server, comprising:
   a receiving unit, adapted to receive billing ticket information reported from a Private Branch eXchange;
   a storing unit, adapted to store the billing ticket information received by the receiving unit; and
   a sending unit, adapted to trigger a fixed wireless station to initiate a packet data service connection to a billing center of a wireless communication system when the Private Branch eXchange is in idle state and send the billing ticket information stored in the storing unit to the billing center after the fixed wireless station has initiated a the packet data service connection successfully.

* * * * *